United States Patent
Mueller

(10) Patent No.: US 12,147,028 B2
(45) Date of Patent: Nov. 19, 2024

(54) APPARATUS AND METHOD FOR PRODUCING THREE-DIMENSIONAL WORK PIECES

(71) Applicant: Nikon SLM Solutions AG, Lübeck (DE)

(72) Inventor: Bernd Mueller, Lübeck (DE)

(73) Assignee: Nikon SLM Solutions AG, Lübeck (DE)

( * ) Notice: Subject to any disclaimer, the term of this patent is extended or adjusted under 35 U.S.C. 154(b) by 761 days.

(21) Appl. No.: 16/648,696

(22) PCT Filed: Oct. 9, 2017

(86) PCT No.: PCT/EP2017/075631
§ 371 (c)(1),
(2) Date: Mar. 19, 2020

(87) PCT Pub. No.: WO2019/072359
PCT Pub. Date: Apr. 18, 2019

(65) Prior Publication Data
US 2020/0230696 A1    Jul. 23, 2020

(51) Int. Cl.
*G02B 26/08* (2006.01)
*B22F 10/28* (2021.01)
(Continued)

(52) U.S. Cl.
CPC .......... *G02B 26/0816* (2013.01); *B22F 10/28* (2021.01); *B22F 10/31* (2021.01);
(Continued)

(58) Field of Classification Search
None
See application file for complete search history.

(56) References Cited

U.S. PATENT DOCUMENTS

| | | | |
|---|---|---|---|
| 2005/0263932 A1* | 12/2005 | Heugel | ............. B22F 12/84 264/497 |
| 2013/0112672 A1 | 5/2013 | Keremes et al. | |

(Continued)

FOREIGN PATENT DOCUMENTS

| | | |
|---|---|---|
| CN | 1519075 | 8/2004 |
| CN | 105451971 | 3/2016 |

(Continued)

OTHER PUBLICATIONS

Machine Translation of EP-2979849-A1 (Year: 2016).*
(Continued)

*Primary Examiner* — Keith Walker
*Assistant Examiner* — Ryan L Heckman
(74) *Attorney, Agent, or Firm* — Williams Mullen; Thomas F. Bergert

(57) ABSTRACT

An apparatus for producing three-dimensional work pieces is provided. The apparatus comprises a carrier configured to receive multiple layers of raw material, and an irradiation unit configured to generate a radiation beam and to direct the radiation beam to predetermined sites of an uppermost layer of the raw material in order to solidify the raw material at the predetermined sites. The irradiation unit comprises a radiation source configured to generate the radiation beam, a first scanning unit configured to receive the radiation beam and to scan the radiation beam over a first irradiation area of the uppermost layer of the raw material, a second scanning unit configured to receive the radiation beam and to scan the radiation beam over a second irradiation area of the uppermost layer of the raw material, and a switching unit configured to direct the radiation beam generated by the radiation source to the first scanning unit or the second scanning unit. The apparatus further comprises a control unit configured to perform control of the switching unit to switch from (Continued)

Figure 1:
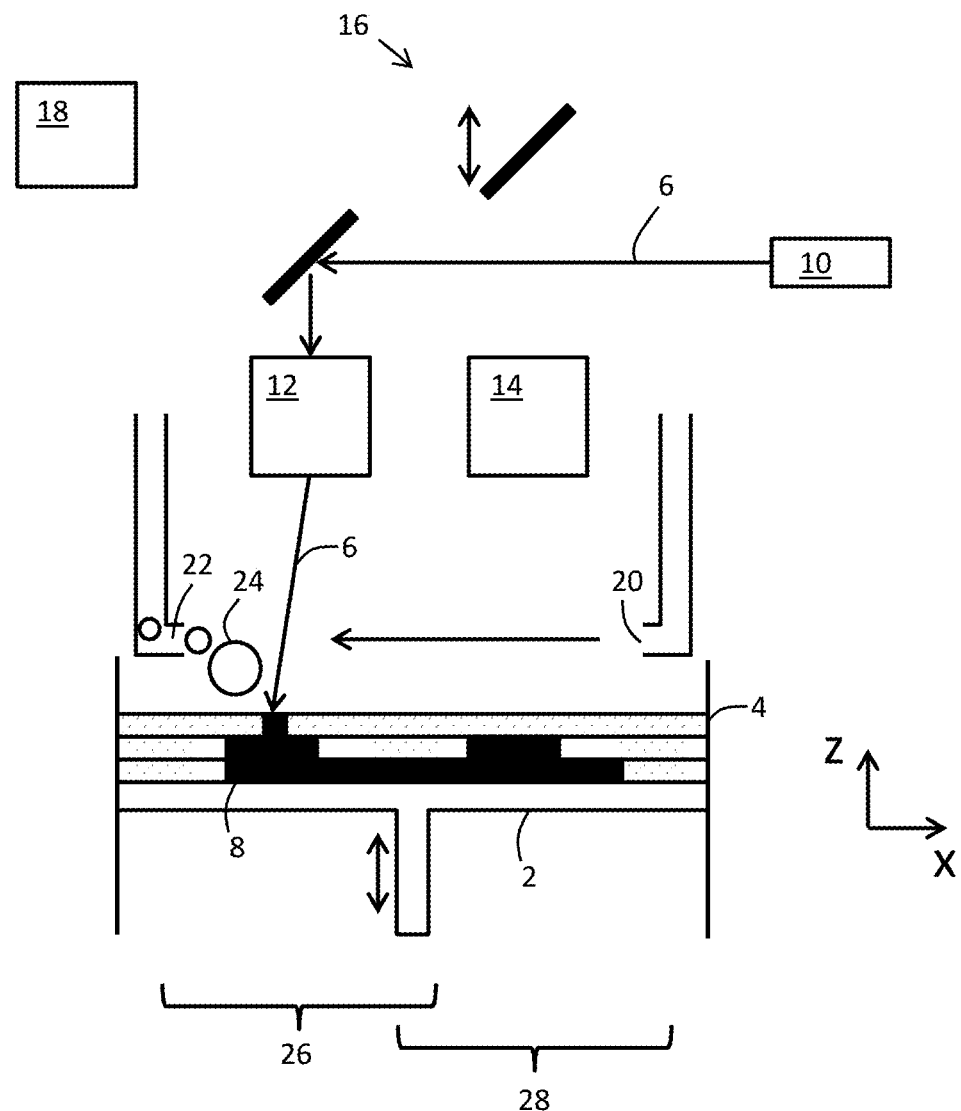

a first switching state, in which the radiation beam is directed to the first scanning unit and not to the second scanning unit, to a second switching state, in which the radiation beam is directed to the second scanning unit and not to the first scanning unit.

14 Claims, 3 Drawing Sheets

(51) Int. Cl.
    *B22F 10/31* (2021.01)
    *B22F 10/322* (2021.01)
    *B22F 10/366* (2021.01)
    *B22F 12/41* (2021.01)
    *B22F 12/46* (2021.01)
    *B22F 12/49* (2021.01)
    *B33Y 10/00* (2015.01)
    *B33Y 30/00* (2015.01)
    *B33Y 50/02* (2015.01)

(52) U.S. Cl.
    CPC ............ *B22F 10/366* (2021.01); *B22F 12/41* (2021.01); *B22F 12/49* (2021.01); *B33Y 10/00* (2014.12); *B33Y 30/00* (2014.12); *B33Y 50/02* (2014.12); *B22F 10/322* (2021.01); *B22F 12/46* (2021.01)

(56) References Cited

U.S. PATENT DOCUMENTS

| | | | | |
|---|---|---|---|---|
| 2013/0134637 A1* | 5/2013 | Wiesner | ............ | B23K 26/0613 264/497 |
| 2014/0198365 A1* | 7/2014 | Li | ............ | B33Y 30/00 359/201.2 |
| 2015/0375543 A1* | 12/2015 | Barnett | ............ | B41J 2/045 16 347/37 |
| 2016/0114432 A1* | 4/2016 | Ferrar | ............ | B23K 26/342 219/76.12 |
| 2016/0136730 A1* | 5/2016 | McMurtry | ............ | B33Y 40/00 359/290 |
| 2017/0014950 A1* | 1/2017 | Okada | ............ | B22F 10/47 |
| 2017/0021572 A1* | 1/2017 | Wiesner | ............ | B23K 26/342 |
| 2017/0189961 A1 | 7/2017 | Ferrar | | |
| 2018/0239096 A1* | 8/2018 | Houbertz | ............ | G02B 6/4214 |
| 2018/0339449 A1* | 11/2018 | Chen | ............ | B33Y 10/00 |
| 2018/0369931 A1* | 12/2018 | Boregowda | ............ | B23B 31/305 |
| 2018/0369961 A1* | 12/2018 | Ishikawa | ............ | B23K 26/0604 |
| 2020/0094320 A1* | 3/2020 | Krol | ............ | B33Y 40/00 |
| 2021/0023622 A1* | 1/2021 | Pieger | ............ | B22F 10/00 |
| 2021/0331252 A1* | 10/2021 | Chang | ............ | B33Y 30/00 |
| 2021/0354372 A1* | 11/2021 | Krol | ............ | B22F 10/28 |

FOREIGN PATENT DOCUMENTS

| | | | | |
|---|---|---|---|---|
| CN | 105492188 | | 4/2016 | |
| CN | 106041083 | A * | 10/2016 | |
| CN | 106363768 | | 2/2017 | |
| CN | 106604822 | | 4/2017 | |
| DE | 10235427 | | 2/2004 | |
| EP | 2979849 | | 2/2016 | |
| EP | 2979849 | A1 * | 2/2016 | ............ B29C 64/153 |
| JP | H5-229017 | | 9/1993 | |
| JP | H5-237943 | | 9/1993 | |
| JP | 2016527101 | | 9/2016 | |
| JP | 2017522204 | | 8/2017 | |
| JP | 2017177557 | | 10/2017 | |
| RU | 2393056 | C1 | 6/2010 | |
| RU | 139624 | U1 | 4/2014 | |

OTHER PUBLICATIONS

Machine Translation of CN-106041083-A (Year: 2016).*
Russian Examination Report, Intellectual Property office of Russia, RU patent Application No. 2020113672/05, Dated Feb. 1, 2021.
International Search Report and Written Opinion for PCT/EP2017/075631, European Patent Office, Jun. 28, 2018.
Chinese National Intellectual Property Administration, Office Action for CN Application No. 2017 800095714.7, Aug. 4, 2021.
Japanese Patent Office, Office Action for JP Application 2020-540671, dated Mar. 2, 2021.

* cited by examiner

APPARATUS AND METHOD FOR PRODUCING THREE-DIMENSIONAL WORK PIECES

CROSS-REFERENCE TO RELATED APPLICATIONS

This application is the U.S. national phase of international application PCT/EP2017/075631, filed on Oct. 9, 2017 which is hereby incorporated herein in its entirety by reference.

The present invention relates to an apparatus and a method for producing three-dimensional work pieces. In particular, the present invention is directed to an apparatus for producing three-dimensional work pieces, wherein the apparatus comprises an irradiation unit with at least two scanning units.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to radiation (e.g., laser or particle radiation) in a site-selective manner in dependence on the desired geometry of the work piece that is to be produced. The radiation penetrating into the powder layer causes heating and consequently melting or sintering of the raw material powder particles. Further raw material powder layers are then applied successively to the layer on the carrier that has already been subjected to radiation treatment, until the work piece has the desired shape and size. Powder bed fusion may be employed for the production of prototypes, tools, replacement parts, high value components or medical prostheses, such as, for example, dental or orthopedic prostheses, on the basis of CAD data. Examples for powder bed fusion techniques include Selective Laser Melting (SLM) and Selective Laser Sintering (SLS).

Besides the aforementioned powder bed fusion techniques, other additive manufacturing techniques are known according to which multiple layers of raw material are solidified by a radiation beam, wherein the raw material is not necessarily provided in powder form but may be provided, e.g., as multiple layers of a fluid.

In recent developments of such additive manufacturing techniques, it is desired to increase the maximum size of a produced work piece in all three dimensions, which makes it necessary to provide a larger area of raw material. Therefore, amongst others, a size of a carrier, onto which the raw material is applied, is increased. In order to handle this increasing area of raw material, an irradiation unit of the respective apparatus needs to be able to irradiate substantially the entire uppermost layer of raw material.

One option for solving this problem is to increase the distance (in a z-direction) between the irradiation unit and the uppermost layer of raw material and to provide one scanning unit as part of the irradiation unit to scan over the entire area. Another option is to provide a movable irradiation unit, wherein a scanning unit of the irradiation unit is moved over the area of raw material in a direction parallel to the carrier, i.e., in an x-direction and/or a y-direction. However, one disadvantage of these solutions is that the accuracy of a position to which the radiation beam is directed is decreased, and, therefore, a quality of the produced work piece may be reduced.

Another option is to provide a plurality of radiation sources, each of which emits a radiation beam to a corresponding scanning unit. However, this solution is expensive and not very efficient if not applied simultaneously.

The invention is directed at the object of providing an apparatus and a method, which solve the above-described problems and/or other related problems.

This object is addressed by an apparatus according to claim 1 and by a method according to claim 11.

According to a first aspect, an apparatus for producing three-dimensional work pieces is provided. The apparatus comprises a carrier configured to receive multiple layers of raw material, and an irradiation unit configured to generate a radiation beam and to direct the radiation beam to predetermined sites of an uppermost layer of the raw material in order to solidify the raw material at the predetermined sites. The irradiation unit comprises a radiation source configured to generate the radiation beam, a first scanning unit configured to receive the radiation beam and to scan the radiation beam over a first irradiation area of the uppermost layer of the raw material, a second scanning unit configured to receive the radiation beam and to scan the radiation beam over a second irradiation area of the uppermost layer of the raw material, and a switching unit configured to direct the radiation beam generated by the radiation source to the first scanning unit or the second scanning unit. The apparatus further comprises a control unit configured to perform control of the switching unit to switch from a first switching state, in which the radiation beam is directed to the first scanning unit and not to the second scanning unit, to a second switching state, in which the radiation beam is directed to the second scanning unit and not to the first scanning unit.

The apparatus may comprise a first vertical movement device configured to lower the carrier (in negative z-direction) after the solidification of a layer of raw material is finished. After this lowering, a new layer of raw material may be applied onto the previous layer and this new layer can be irradiated by the radiation beam. In addition or alternatively, the apparatus may comprise a second vertical movement device configured to raise (in positive z-direction) the irradiation unit or at least the scanning units of the irradiation unit after the solidification of a layer of raw material is finished.

The irradiation unit may comprise a laser and the radiation beam may be a laser beam. The radiation beam may be directed to the respective scanning unit through the surrounding atmosphere and, optionally, by means of optical components such as mirrors, lenses, prisms, etc. Additionally or alternatively, the radiation beam may be directed to the respective scanning unit via one or more optical fibers. Since the radiation beam can be directed to the respective scanning units, the radiation source does not necessarily have to be provided in close proximity of the scanning units (e.g., on a same support member).

The first irradiation area and the second irradiation area may each have a substantially rectangular shape. The first irradiation area and the second irradiation area may be defined by a maximum deflection of a movable mirror of the respective scanning unit. In other words, the irradiation areas may be defined as the largest possible area that can be irradiated by the respective scanning unit. An overlap area may be provided at a region where the first irradiation area and the second irradiation area overlap.

The switching unit can be configured such that it can only direct the radiation beam to one scanning unit at the same time and not simultaneously to more than one irradiation units.

Of course, according to the entire present disclosure, the switching unit and the control unit may not only be configured to switch from the first switching state to the second switching state but also may be configured to switch from the second switching state to the first switching state.

By directing the radiation beam generated by one radiation source to only one of the first and second scanning units at the same time, the radiation source can be efficiently used and it can be avoided that the radiation beam is negatively impacted by melting residue generated by another melting process occurring at the same time.

The switching unit may comprise a light directing member, which is configured to be moved from a first position corresponding to the first switching state to a second position corresponding to the second switching state, wherein, in the first position, the light directing member does not interfere with the radiation beam, and in the second position, the light directing member is configured to direct the radiation beam to the second scanning unit and to block a beam path to the first scanning unit.

Since, in the second position, the light directing member blocks the beam path to the first scanning unit, the radiation beam cannot be directed to the first scanning unit and the second scanning unit at the same time. Therefore, providing such a light directing member represents an easy and efficient way of providing a switching unit for switching between the first and the second switching state.

The light directing member may be a movable mirror. The movable mirror can be moved, e.g., along a movement axis into and out of the radiation beam. Alternatively, the movable mirror may be rotated (i.e., folded) with regard to a rotation axis into and out of the radiation beam.

The apparatus may further comprise a gas outlet and a gas inlet for producing a gas flow between the gas outlet and the gas inlet along a flow direction, wherein the first scanning unit and the second scanning unit are arranged substantially along the flow direction.

The gas outlet and the gas inlet may respectively be provided in the form of openings. For example, the gas outlet and/or the gas inlet may comprise a slit. The gas outlet and/or the gas inlet may be provided, e.g., in a wall of a process chamber of the apparatus. Further, the gas outlet and/or the gas inlet may be provided in a gas outlet arm and/or a gas inlet arm, respectively. The gas outlet arm and/or the gas inlet arm may be configured such that they can be brought in close proximity with the uppermost layer of the raw material in order to produce the gas flow in close proximity to the uppermost layer of the raw material. The flow direction may be parallel to the uppermost layer of the raw material. For example, the flow direction may be a (positive or negative) x-direction. Although it may be the case that the gas flow is not a laminar flow in only one direction, it should be appreciated that the gas flow has one substantial preferential direction, which corresponds to the flow direction. For example, the flow direction may be defined as a direction along which the gas inlet and the gas outlet are arranged. A gas used for the gas flow may be an inert gas, such as nitrogen. By producing a gas flow, it can be possible to remove (i.e., take away) melting residue generated by a solidification process of the radiation beam.

The first scanning unit may be configured to change a direction of the radiation beam along a first direction and along a second direction perpendicular to the first direction, in order to scan the radiation beam over the first irradiation area. The second scanning unit may be configured to change a direction of the radiation beam along the first direction and along the second direction, in order to scan the radiation beam over the second irradiation area.

The first direction and the second direction may both be parallel to the uppermost layer of the raw material. For example, the first direction may be an x-direction and the second direction may be a y-direction (or vice versa). In order to change the direction of the radiation beam along the first and the second direction, the first scanning unit and/or the second scanning unit may comprise at least two movable mirrors. A first movable mirror may be configured to move along the first direction and a second movable mirror may be configured to move along the second direction. Alternatively, one movable mirror may be provided, which is movable in both the first and the second direction. Besides the possibility of changing a direction along the first and the second direction, a focusing optic may be provided, which is configured to change a focus position of the radiation beam in a direction along the beam path, i.e., in a direction substantially perpendicular to the uppermost layer of the raw material (z-direction). The focusing optic may be provided in the beam path upstream from the first and the second scanning units, such that only one focusing optic needs to be provided for the first and the second scanning unit. Further, a first and a second focusing optic may be integrated in the first and the second scanning units, respectively.

The first scanning unit and the second scanning unit may each be provided stationary with regard to directions parallel to the uppermost layer of the raw material.

In other words, the first scanning unit and the second scanning unit may be provided such that they are not movable with regard to directions parallel to the uppermost layer of the raw material (e.g., x- and y-direction). However, the first scanning unit and/or the second scanning unit may be movable with regard to a direction perpendicular to the uppermost layer of the raw material (e.g., a z-direction). A location of the first irradiation area and a location of the second irradiation area may not change during the entire building process of a work piece. When the first scanning unit and the second scanning unit are provided stationary, an accuracy of positioning the radiation beam with regard to the uppermost layer of the raw material may be improved.

A further first scanning unit and a further second scanning unit may be provided next to the first scanning unit and the second scanning unit, wherein the further first scanning unit and the further second scanning unit are arranged along a direction parallel to the direction along which the first scanning unit and the second scanning unit are arranged.

For example, the further first scanning unit may be provided next to the first scanning unit along a direction perpendicular to a direction along which the first scanning unit and the second scanning unit are arranged. For example, the further second scanning unit may be provided next to the second scanning unit along a direction perpendicular to the direction along which the first scanning unit and the second scanning unit are arranged.

The further first scanning unit and the further second scanning unit may be configured such that at a given time, either the further first scanning unit or the further second scanning unit but not both further scanning units emit a radiation beam. For this purpose, a corresponding further switching unit may be provided and the control unit may be configured to perform a corresponding switching, similar to the switching of the first scanning unit and the second scanning unit. Additionally or alternatively, a third scanning unit may be provided at a position along a direction along which the first scanning unit and the second scanning unit are arranged. In that case, the switching unit and the control unit may be configured such that switching is performed between three switching states, wherein in the first switching state, only the first switching unit emits a radiation beam and the second and third switching units do not emit a radiation beam, in the second switching state, only the second switching unit emits a radiation beam and the first and third switching units do not emit a radiation beam, and in third switching state, only the third switching unit emits a radiation beam and the first and second switching units do not emit a radiation beam. In addition to that and in a similar manner, a fourth, fifth, etc. scanning unit may be provided.

The irradiation unit may comprise a further radiation source configured to generate a further radiation beam, and a further switching unit configured to direct the further radiation beam to the further first scanning unit or the further second scanning unit.

The further switching unit may be configured such that in a first switching state, the further radiation beam is only directed to the further first scanning unit and not to the further second scanning unit, and in a second switching state, the further radiation beam is only directed to the further second scanning unit and not to the further first scanning unit. The further radiation source may either be represented by an additional physical radiation source (such as an additional laser) or by a further beam path branched off a main beam path generated by a main radiation source (such as a main laser). By providing a further radiation source and a further switching unit, the further radiation source can be efficiently used.

At least three first scanning units may be provided along the direction perpendicular to the direction along which the first scanning unit and the second scanning unit are arranged. At least three second scanning units may be provided along the direction perpendicular to the direction along which the first scanning unit and the second scanning unit are arranged.

By providing at least three first scanning units and/or at least three second scanning units, multiple rows of scanning units may be provided and the area of the uppermost layer of raw material may be efficiently illuminated.

The control unit may be configured to control the switching from the first switching state to the second switching state based on the presence of melting residue in the first irradiation area and/or in the second irradiation area.

In the present disclosure, the expression "melting residue" is used for any kind of residue (e.g., in the form of vapor, such as metal vapor, condensate, and/or spattered powder) that might occur in a melting process, welding process and/or solidification process of the raw material. The melting residue is generated by the solidification process, where the radiation beam hits the raw material. The gas flow may be provided to take away the melting residue via the gas inlet. Melting residue in the first irradiation area may be generated by a radiation beam emitted by the first scanning unit and/or by a radiation beam emitted by the second scanning unit in case the first irradiation area is located downstream of the second irradiation area with regard to the gas flow. Similarly, melting residue in the second irradiation area may be generated by a radiation beam emitted by the second scanning unit and/or by a radiation beam emitted by the first scanning unit in case the second irradiation area is located downstream of the first irradiation area with regard to the gas flow. The control unit may be programmed such that it is aware of the presence of melting residue in the first and/or the second irradiation area, e.g., based on previous calibration measurements or test runs.

According to a second aspect, a method for producing three-dimensional work pieces is provided. The method comprises applying multiple layers of raw material onto a carrier, generating, by an irradiation unit, a radiation beam and directing the radiation beam to predetermined sites of an uppermost layer of the raw material in order to solidify the raw material at the predetermined sites, wherein the irradiation unit comprises a radiation source configured to generate the radiation beam. The method further comprises receiving, by a first scanning unit, the radiation beam and scanning the radiation beam over a first irradiation area of the uppermost layer of the raw material, receiving, by a second scanning unit, the radiation beam and scanning the radiation beam over a second irradiation area of the uppermost layer of the raw material, and performing control of a switching unit to switch from a first switching state, in which the radiation beam is directed to the first scanning unit and not to the second scanning unit, to a second switching state, in which the radiation beam is directed to the second scanning unit and not to the first scanning unit.

The details discussed above with regard to the first aspect may also apply to the second aspect where appropriate. In particular, the method defined by the second aspect may be a method for producing a three-dimensional work piece with the apparatus according to the first aspect.

The method may further comprise moving a light directing member from a first position corresponding to the first switching state to a second position corresponding to the second switching state, wherein, in the first position, the light directing member does not interfere with the radiation beam, and in the second position, the light directing member directs the radiation beam to the second scanning unit and blocks a beam path to the first scanning unit.

The method may further comprise producing a gas flow along a flow direction, wherein the first scanning unit and the second scanning unit are arranged substantially along the flow direction.

The first scanning unit may change a direction of the radiation beam along a first direction and along a second direction perpendicular to the first direction, in order to scan the radiation beam over the first irradiation area. The second scanning unit may change a direction of the radiation beam along the first direction and along the second direction, in order to scan the radiation beam over the second irradiation area.

The switching from the first switching state to the second switching state may be controlled based on the presence of melting residue in the first irradiation area and/or in the second irradiation area.

Figure 2:
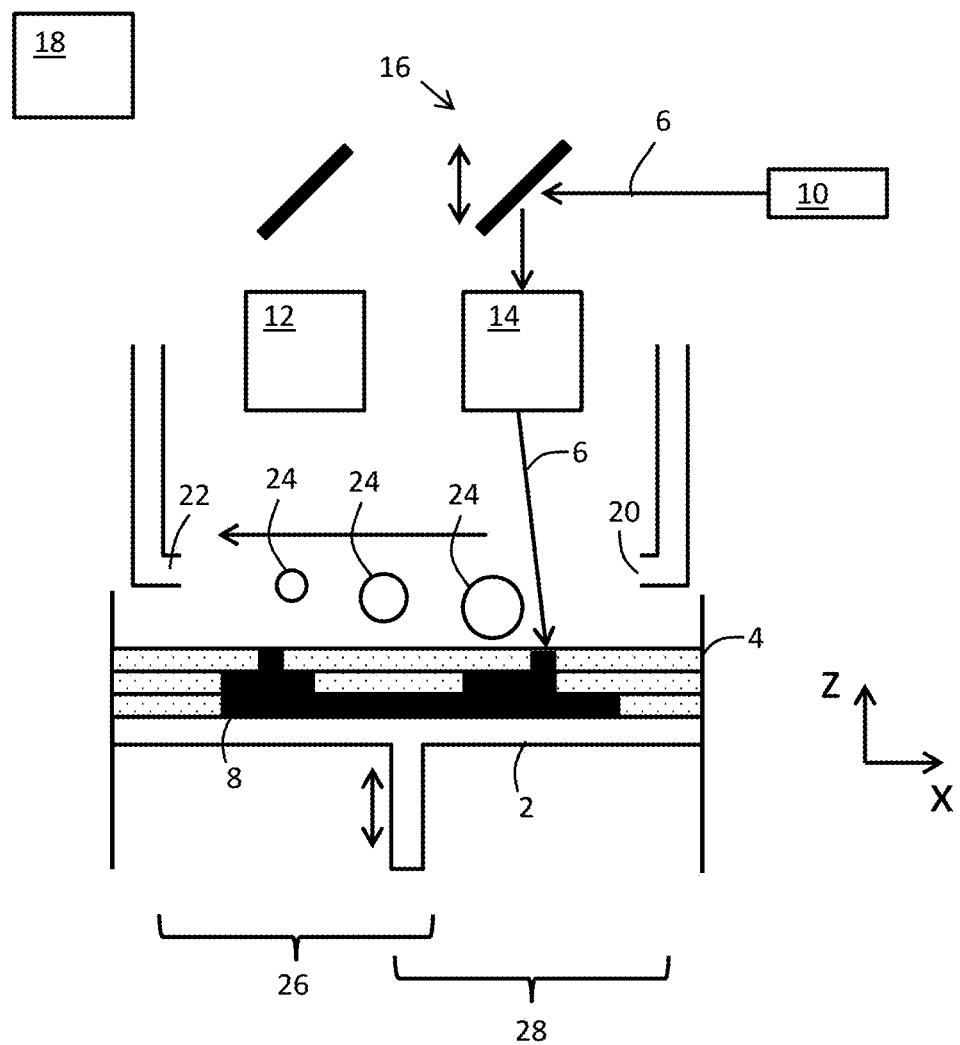
Figure 3:
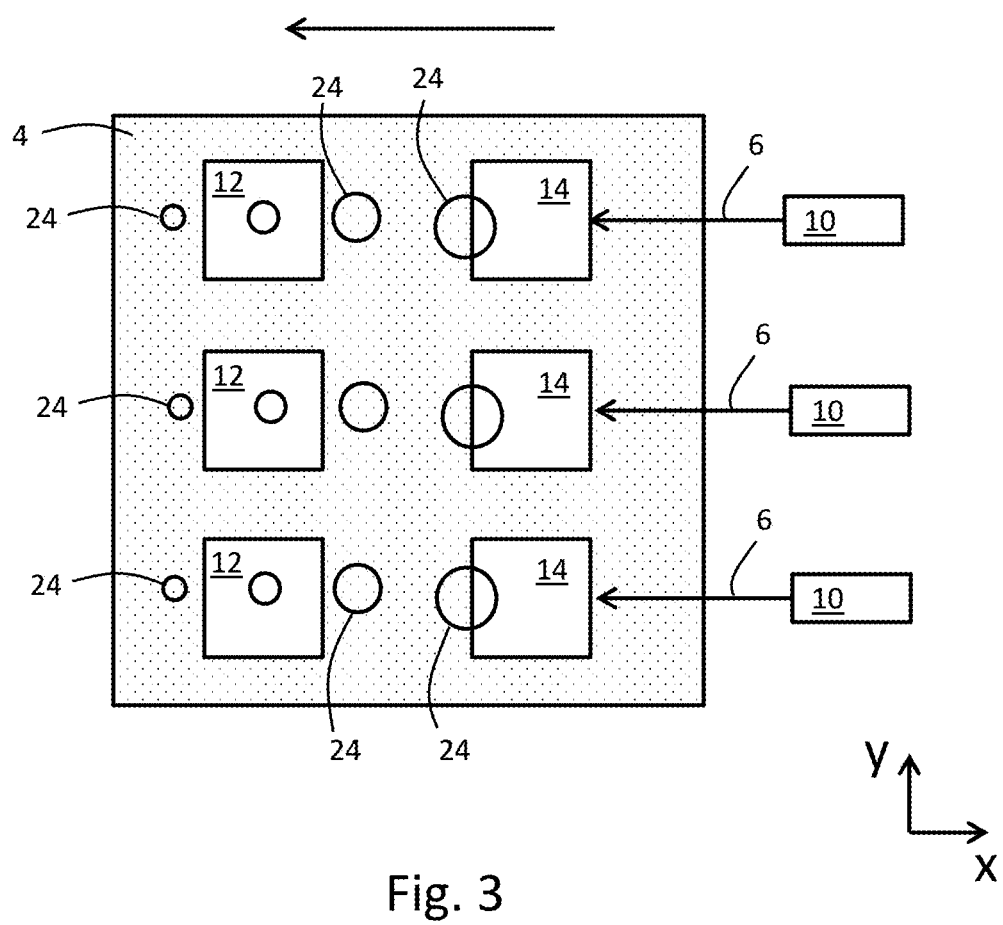

Preferred embodiments of the invention are described in greater detail with reference to the appended schematic drawings, wherein FIG. 1 shows a schematic side view of an apparatus according to the present disclosure, wherein the switching unit is in the first switching state;

FIG. 2 shows a schematic side view of the apparatus of FIG. 1, wherein the switching unit is in the second switching state; and FIG. 3 shows a schematic top view of an apparatus according to the present disclosure, wherein a plurality of first scanning units and a plurality of second scanning units are provided.

FIG. 1 shows a schematic side view of an apparatus for producing three-dimensional work pieces according to the present disclosure. The apparatus comprises a carrier 2, which is configured to receive multiple layers of raw material 4. During a building process, a first layer of raw material 4 is applied onto the carrier 2 by means of a raw material application device (not shown) of the apparatus. In the present embodiment, the raw material 4 is a raw material powder (e.g, metal powder), which can be melted and solidified by a radiation beam 6. In this case, the raw material application device is a powder application device.

However, in other embodiments, different raw material (e.g., different materials and/or different texture) may be used as the raw material 4.

The radiation beam 6 is directed to the first layer of raw material 4 in order to solidify the raw material 4 in a site-selective manner according to CAD data of a work piece 8 to be produced. The locations on the uppermost layer of the raw material 4 to which the radiation beam 6 is directed therefore correspond to a geometry of the work piece 8 to be produced. The carrier 2 is movable along the z-direction (indicated by an arrow in FIG. 1) in order to lower the carrier 2 after a solidification process of a layer of raw material 4 is finished. After the carrier 2 has been lowered, a new layer of raw material 4 is applied and a solidification process (i.e., an irradiation process) of this new layer begins. Thus, layer by layer, the work piece 8 is built up on the carrier 2.

The apparatus further comprises an irradiation unit comprising a radiation source 10, a first scanning unit 12, a second scanning unit 14 and a switching unit 16. In addition or as an alternative to the vertically movable carrier 2, at least the first scanning unit 12 and the second scanning unit 14 may be vertically movable (in the z-direction) with regard to the carrier 2. As an alternative to lowering the carrier 2, the scanning units 12 and 14 may be raised after a solidification process of a layer of raw material 4 is finished. Thereby, a distance between the scanning units 12, 14 and the uppermost layer of raw material 4 can be kept substantially constant.

According to the present embodiment, the radiation source 10 is a laser and the emitted radiation beam 6 is a laser beam. More precisely, the radiation source 10 may, for example, comprise a diode pumped Ytterbium fiber laser emitting laser light having a wavelength of approximately 1070 to 1080 nm. The irradiation unit is configured to selectively irradiate the radiation beam 6 onto the raw material 4 on the carrier 2. By means of the irradiation unit, the raw material 4 may be subjected to laser radiation in a site-selective manner in dependence on the desired geometry of the work piece 8 that is to be produced.

Each of the scanning units 12 and 14 of the present embodiment comprises movable mirrors for directing the radiation beam 6 in directions parallel to the carrier 2, i.e., directions parallel to the uppermost layer of raw material 4. In other words, a location of the radiation beam 6 can be varied both in the x-direction and the y-direction. In alternative embodiments, different technologies for deflecting the radiation beam 6 in the x-direction and the y-direction may be implemented.

The apparatus further comprises a control unit 18 for controlling functionalities of the apparatus before, during, and after a building process. In particular, the control unit 18 is configured to control the switching of the switching unit 16 from a first switching state to a second switching state or from the second switching state to the first switching state, as described in detail below. The control unit 18 is further configured to control other functionalities of the device, such as the vertical movement of the carrier 2, the raw material application by the raw material application device, the gas flow described below, the scanning of the scanning units 12 and 14, and the radiation source 10.

In addition to the scanning units 12, 14, further optical components may be provided for guiding and/or processing the radiation beam 6. For example, a beam expander may be provided for expanding the radiation beam 6. A focusing optic may be provided before or after (with regard to a beam path of the radiation beam 6) the scanning units 12 and 14. Alternatively, a focusing optic may be integrated into each of the scanning units 12 and 14. In both cases, the focusing optic is configured to adjust a focus position of the radiation beam 6 along the beam path of the radiation beam 6 and, therefore, substantially along the z-axis. Further, object lenses may be provided behind each of the scanning units 12 and 14. The object lenses may be f-theta object lenses.

Further, the apparatus comprises a gas outlet 20 and a gas inlet 22. As shown in FIG. 1, the gas outlet 20 is provided at a gas outlet arm and the gas inlet 22 is provided at a gas inlet arm. The gas outlet 20 is an opening in the gas outlet arm through which an inert gas can be emitted into the building chamber. The gas inlet 22 is an opening in the gas inlet arm via which the inert gas can be sucked in. A gas flow is generated between the gas outlet 20 and the gas inlet 22, as indicated by an arrow in FIG. 1. According to FIG. 1, a direction of the gas flow corresponds to a negative x-direction.

The gas flow is configured to take away melting residue 24 which is generated by the melting process, wherein the radiation beam 6 hits the raw material 4 and generates a melt pool for solidifying the raw material 4. The melting residue 24 is blown into the direction of the gas flow and is sucked into the gas inlet 22 together with the inert gas. The melting residue 24 is taken away by the gas flow because the presence of melting residue 24 may negatively influence the following solidification process. In particular, when melting residue 24 is present in a region where a solidification process occurs, the radiation beam 6 might be partially absorbed, scattered, and/or deflected by the melting residue 24.

The apparatus comprises the first scanning unit 12 and the second scanning unit 14 in order to be able to irradiate a large area of the uppermost layer of raw material 4 and, thus, to be able to generate a large work piece 8. In order to enable the irradiation of a large area, the first scanning unit 12 is configured to scan a radiation beam 6 over a first irradiation area 26 and the second scanning unit 14 is configured to scan a radiation beam 6 over a second irradiation area 28. The irradiation areas 26 and 28 therefore each represent an area that can be reached by a radiation beam 6 emitted by the respective scanning unit 12 or 14. As shown in FIG. 1, an overlap area can be provided, in which the first irradiation area 26 and the second irradiation area 28 overlap.

In the following it will be described how the switching of the switching unit 16 is controlled by the control unit 18 during a solidification process of a layer of raw material 4. FIG. 1 shows the apparatus in the first switching state. In the first switching state, the radiation beam 6 emitted by the radiation source 10 is directed to the first scanning unit 12. The radiation beam 6 is received by the first scanning unit 12 and scanned over the first irradiation area 26 according to the desired geometry of the work piece 8. Melting residue 24, which is generated during this solidification process is taken away via the gas flow. In the first switching state, the radiation beam 6 generated by the radiation source 10 is only directed to the scanning unit 12 and not to any other scanning units such as the scanning unit 14. In the first switching state, a light directing member (a movable mirror) of the switching unit 16 is positioned such that it does not interfere with the radiation beam 6. Thereby, the radiation beam 6 can pass to the first scanning unit 12. In the embodiment shown in FIG. 1, the switching unit 16 comprises a movable mirror as light directing member, which can be moved into and out of the beam path of the radiation beam 6, based on a control of the control unit 18.

When the solidification process in the first irradiation area 26 is finished, the control unit 18 performs control to switch the switching unit 16 from the first switching state shown in FIG. 1 to the second switching state shown in FIG. 2. FIG. 2 shows the apparatus of FIG. 1 in the second switching state. In the second switching state, the light directing member of the switching unit 16 is moved into the radiation beam 6 and thereby directs the radiation beam 6 to the second scanning unit 14. As shown in FIG. 2, the light directing member of the switching unit 16 blocks a beam path to the first scanning unit 12 and, therefore, the radiation beam 6 is only directed to the second scanning unit 14 and not to the first scanning unit 12.

In the second switching state the second scanning unit 14 performs irradiation of the second irradiation area 28, according to the desired geometry of the work piece 8 to be produced. Melting residue 24, which is generated during the melting process, is taken away via the gas flow. As shown in FIG. 2, the melting residue 24 thereby passes the first irradiation area 26. Due to this melting residue 24 in the first irradiation area 26, no melting process is initiated in the first irradiation area 26 at the same time as the melting process in the second irradiation area 28 takes place. In other words, a negative influence on a melting process due to melting residue 24 generated by a different melting process can be avoided by only performing one melting process of scanning units 12, 14 arranged along the gas flow at the same time. However, as explained below with regard to FIG. 3, different melting processes may be carried out at the same time by scanning units that are arranged in a direction substantially perpendicular to or basically divergent from the gas flow.

When the irradiation process of the second irradiation area 28 is finished, a new layer of raw material 4 can be applied onto the carrier 2 and/or the control unit 18 may perform control to switch the switching unit 16 back to the first switching state shown in FIG. 1.

FIG. 3 shows a top view of an embodiment of an apparatus according to the present disclosure, which comprises three radiation sources 10, three first scanning units 12, and three second scanning units 14. The functionality of the device shown in FIG. 3 is the same as described with regard to FIGS. 1 and 2. Further, the device of FIG. 3 comprises all of the elements described with regard to FIGS. 1 and 2 and, therefore, some of these elements are omitted in FIG. 3 and in the following description.

In the device of FIG. 3, a gas flow is produced in negative x-direction (indicated by an arrow). The gas flow may be provided by a plurality of gas outlets 20 and gas inlets 22 or by one large gas outlet 20 and one large gas inlet 22, e.g., in the form of slit openings.

FIG. 3 shows the apparatus in a second switching state, where the radiation beam 6 emitted by each of the radiation sources 10 is directed to a corresponding one of the second scanning units 14. The scanning units 14 perform a solidification process of corresponding second irradiation areas. The melting residue 24 generated by these solidification processes is taken away by the gas flow. As shown in FIG. 3, the radiation beams 6 are only directed to the second scanning units 14 but not to the first scanning units 12. However, the first scanning unit 12 and the second scanning unit 14 of each of the radiation sources 10 may be individually switched by a corresponding switching unit under control of the control unit 18. Hence, the apparatus of FIG. 3 comprises three individually controllable switching units.

Based on the geometry of the work piece 8 to be produced and in order to achieve an effective procedure of the building process, it is possible that one or more of the switching units are in a first switching state, and one or more of the switching units are in a second switching state at the same time. As shown in FIG. 3, irradiation areas of the apparatus are only influenced by melting processes in other irradiation areas along the direction of the gas flow, but not perpendicular to this direction.

It should be appreciated that the device shown in FIG. 3 is only an example for an arrangement of scanning units 12 and 14. Departing from the arrangement shown in FIG. 3, an arbitrary number of first scanning units 12 and an arbitrary number of second scanning units 14 may be provided next to each other in a row along a direction (y-direction) perpendicular to the gas flow. Similarly, an arbitrary number (larger than one) of scanning units may be provided along the direction of the gas flow, such that a first scanning unit 12, a second scanning unit 14, and one or more further scanning units (third scanning unit, fourth scanning unit, etc.) are provided. In that case, a switching unit is provided and the control unit 18 performs switching of the switching unit, such that at a given time only one of the first, second, third, etc. scanning units receives a radiation beam 6. Thereby it can be guaranteed that no irradiation area is negatively influenced by melting residue 24.

The invention claimed is:

1. An apparatus for producing three-dimensional work pieces, comprising:
   a carrier configured to receive multiple layers of raw material; and
   an irradiation unit configured to generate a radiation beam and to direct the radiation beam to predetermined sites of an uppermost layer of the raw material in order to solidify the raw material at the predetermined sites;
   wherein the irradiation unit comprises:
   a radiation source configured to generate the radiation beam;
   a first scanning unit configured to receive the radiation beam and to scan the radiation beam over a first irradiation area of the uppermost layer of the raw material;
   a second scanning unit configured to receive the radiation beam and to scan the radiation beam over a second irradiation area of the uppermost layer of the raw material; and
   a switching unit configured to direct the radiation beam generated by the radiation source to the first scanning unit or the second scanning unit,
   wherein the apparatus further comprises a control unit configured to perform control of the switching unit to switch from a first switching state, in which the radiation beam is directed to the first scanning unit and not to the second scanning unit, to a second switching state, in which the radiation beam is directed to the second scanning unit and not to the first scanning unit, and
   wherein the switching unit comprises a light directing member, which is configured to be moved from a first position corresponding to the first switching state to a second position corresponding to the second switching state, wherein, in the first position, the light directing member does not interfere with the radiation beam as it travels a beam path to the first scanning unit, and in the second position, the light directing member directs the radiation beam to the second scanning unit and blocks the a beam path to the first scanning unit.

2. The apparatus of claim 1, wherein the light directing member is a movable mirror.

3. The apparatus of claim 1, wherein the first scanning unit is configured to change a direction of the radiation beam along a first direction and along a second direction perpendicular to the first direction, in order to scan the radiation beam over the first irradiation area, and wherein the second scanning unit is configured to change a direction of the radiation beam along the first direction and along the second direction, in order to scan the radiation beam over the second irradiation area.

4. The apparatus of claim 1, wherein the first scanning unit and the second scanning unit are each provided stationary with regard to directions parallel to the uppermost layer of the raw material.

5. The apparatus of claim 1, wherein an additional first scanning unit and an additional second scanning unit are provided next to the first scanning unit and the second scanning unit, wherein the additional first scanning unit and the additional second scanning unit are arranged along a direction parallel to the direction along which the first scanning unit and the second scanning unit are arranged.

6. The apparatus of claim 5, wherein the irradiation unit comprises an additional radiation source configured to generate an additional radiation beam, and an additional switching unit configured to direct the additional radiation beam to the additional first scanning unit or the additional second scanning unit.

7. The apparatus according to claim 5, wherein at least three first scanning units are provided along the direction perpendicular to the direction along which the first scanning unit and the second scanning unit are arranged and at least three second scanning units are provided along the direction perpendicular to the direction along which the first scanning unit and the second scanning unit are arranged.

8. The apparatus according to claim 1, wherein the control unit is configured to control the switching from the first switching state to the second switching state based on the presence of melting residue in the first irradiation area and/or in the second irradiation area.

9. The apparatus according to claim 1, wherein an overlap area is provided at a region where the first irradiation area and the second irradiation area overlap.

10. The apparatus according to claim 1, further comprising a gas outlet and a gas inlet for producing a gas flow between the gas outlet and the gas inlet along a flow direction, wherein the first scanning unit and the second scanning unit are arranged substantially along the flow direction of the gas flow in the building chamber.

11. A method for producing three-dimensional work pieces comprising:
applying multiple layers of raw material onto a carrier;
generating, by an irradiation unit, a radiation beam and directing the radiation beam to predetermined sites of an uppermost layer of the raw material in order to solidify the raw material at the predetermined sites, wherein the irradiation unit comprises a radiation source configured to generate the radiation beam:
receiving, by a first scanning unit, the radiation beam and scanning the radiation beam over a first irradiation area of the uppermost layer of the raw material;
receiving, by a second scanning unit, the radiation beam and scanning the radiation beam over a second irradiation area of the uppermost layer of the raw material;
performing control of a switching unit to switch from a first switching state, in which the radiation beam is directed to the first scanning unit and not to the second scanning unit, to a second switching state, in which the radiation beam is directed to the second scanning unit and not to the first scanning unit; and
moving a light directing member from a first position corresponding to the first switching state to a second position corresponding to the second switching state, wherein, in the first position, the light directing member does not interfere with the radiation beam as it travels a beam path to the first scanning unit, and in the second position, the light directing member directs the radiation beam to the second scanning unit and blocks the a beam path to the first scanning unit.

12. The method of claim 11, further comprising:
producing a gas flow along a flow direction in the building chamber between a gas outlet and a gas inlet.

13. The method of claim 11, wherein the first scanning unit changes a direction of the radiation beam along a first direction and along a second direction perpendicular to the first direction, in order to scan the radiation beam over the first irradiation area, and wherein the second scanning unit changes a direction of the radiation beam along the first direction and along the second direction, in order to scan the radiation beam over the second irradiation area.

14. The method of claim 11, wherein the switching from the first switching state to the second switching state is controlled based on the presence of melting residue in the first irradiation area and/or in the second irradiation area.

* * * * *